Aug. 30, 1966 R. J. HALSEY 3,270,137

BRANCHING DEVICE FOR TWO-WIRE CARRIER MULTICHANNEL COMMUNICATION

Filed Jan. 14, 1963 2 Sheets-Sheet 1

INVENTOR
REGINALD J. HALSEY

BY Hall + Houghton

ATTORNEY

Aug. 30, 1966 R. J. HALSEY 3,270,137

BRANCHING DEVICE FOR TWO-WIRE CARRIER MULTICHANNEL COMMUNICATION

Filed Jan. 14, 1963 2 Sheets-Sheet 2

INVENTOR
REGINALD J. HALSEY,

BY Hall & Houghton

ATTORNEY

United States Patent Office 3,270,137
Patented August 30, 1966

3,270,137

BRANCHING DEVICE FOR TWO-WIRE CARRIER MULTICHANNEL COMMUNICATION SYSTEMS

Reginald John Halsey, Radlett, England, assignor to Her Majesty's Postmaster General, of The General Post Office, London, England Filed Jan. 14, 1963, Ser. No. 251,149
Claims priority, application Great Britain, Jan. 19, 1962, 2,101/62
24 Claims. (Cl. 179—15)

This invention relates to two-wire carrier multichannel communication systems in which a single cable connects two terminal stations. Channels for communication from one terminal station to the other in one direction may be arranged in one part of the frequency band over which transmission between the terminal stations takes place, whilst channels for communication in an opposite direction between the two terminal stations may be arranged in a different portion of the frequency band. Repeaters may be connected in the cable between the terminal stations, each repeater comprising a single amplifier associated with a network of filters whereby transmissions in both directions between channels of the terminal stations are amplified by the same amplifier.

It is an object of this invention to provide a branching device, suitable for connection in a two-wire carrier multichannel communication system, which permits of communication between two terminal stations of the system as well as between the respective terminal stations and a further terminal station.

Accordingly, the present invention provides a branching device for a two-wire carrier multichannel communication system having three terminal stations, the branching device having three terminal points for connection by respective two-wire links to the terminal stations, means providing transmission paths in opposite directions within first and second frequency groups respectively between first and second of the terminal points, means providing transmission paths in opposite directions within third and fourth frequency groups respectively between the first and third of the terminal points, means including a frequency change arrangement interconnecting the second and the third terminal points providing respective opposite direction transmission paths, the transmission path from the second to the third terminal point including means defining one of the third and fourth frequency groups connected to an input of the frequency changer arrangement and means defining one of the first and second frequency groups connected to an output of the frequency changer arrangement, and the transmission path from the third terminal point to the second terminal point including means defining the other one of the first and second frequency groups connected to an input of the frequency changer arrangement and means defining the other one of the third and fourth frequency groups connected to an output of the frequency changer arrangement.

In a communication system embodying a branching device constructed in accordance with the invention, it is possible to ensure direct communication between any two of the terminal stations without the transmission passing to the other terminal station.

Conveniently, it may be arranged that the first and third frequency groups together comprise a lower division of a frequency band and the second and fourth frequency groups together comprise an upper division of the frequency band. The first and second frequency groups may define lower portions of the respective lower and upper divisions of the frequency band. With such an arrangement the frequency changer arrangement may comprise a single modulator which effects the changes in frequency necessary for transmission between the second and third terminals in both directions. In these circumstances, it is arranged that for one direction of transmission frequencies lying in the upper portion of the upper division are changed to frequencies lying in the lower portion of the lower division and that for transmission in the opposite direction, frequencies lying in the lower portion of the upper division are changed to frequencies lying in the upper portion of the lower division. The carrier signal for the modulator may be supplied to the branching device via the third terminal point, means being provided to route the carrier signal only to the desired terminals of the modulator.

The transmission paths may conveniently be defined by low-pass and high-pass filters suitably interconnected.

Other relationships between the frequency groups also may be utilised. For example, the first and third frequency groups together may comprise a lower division of a frequency band with the first group defining a lower portion of the lower division whilst the second and fourth frequency groups together comprise an upper division of the frequency band with the fourth group defining a lower portion of the upper division. Alternatively, the second and fourth frequency groups together may define a lower division of frequency band with the second frequency group defining a lower portion of the lower division and the first and third frequency groups together may define an upper division of the frequency band with the third frequency group defining a lower portion of the upper division.

The invention comprehends also a two-wire carrier multichannel communication system having three terminal stations and incorporating a branching device according to the invention. The terminal points of the branching device are connected to the terminal points of the system by respective two-wire links which may include both-way amplifiers or repeaters. Equalisers also may be connected at each of the terminal points of the branching device to ensure that the impedance characteristics seen looking into these terminal points from the outside are the same as would be seen looking into the cable. A branching device in accordance with the invention may be utilised in an overland communication system but finds particular use in a submarine cable system.

By way of example the invention will be described in greater detail with reference to the accompanying drawings, in which:

FIG. 1 shows schematically a two-wire carrier multichannel communication system including a branching device according to the invention in order to enable communication in opposite directions to take place between main terminal staions A and B and also between a subsidiary terminal station C and respective ones of stations A and B.

Figure 1:
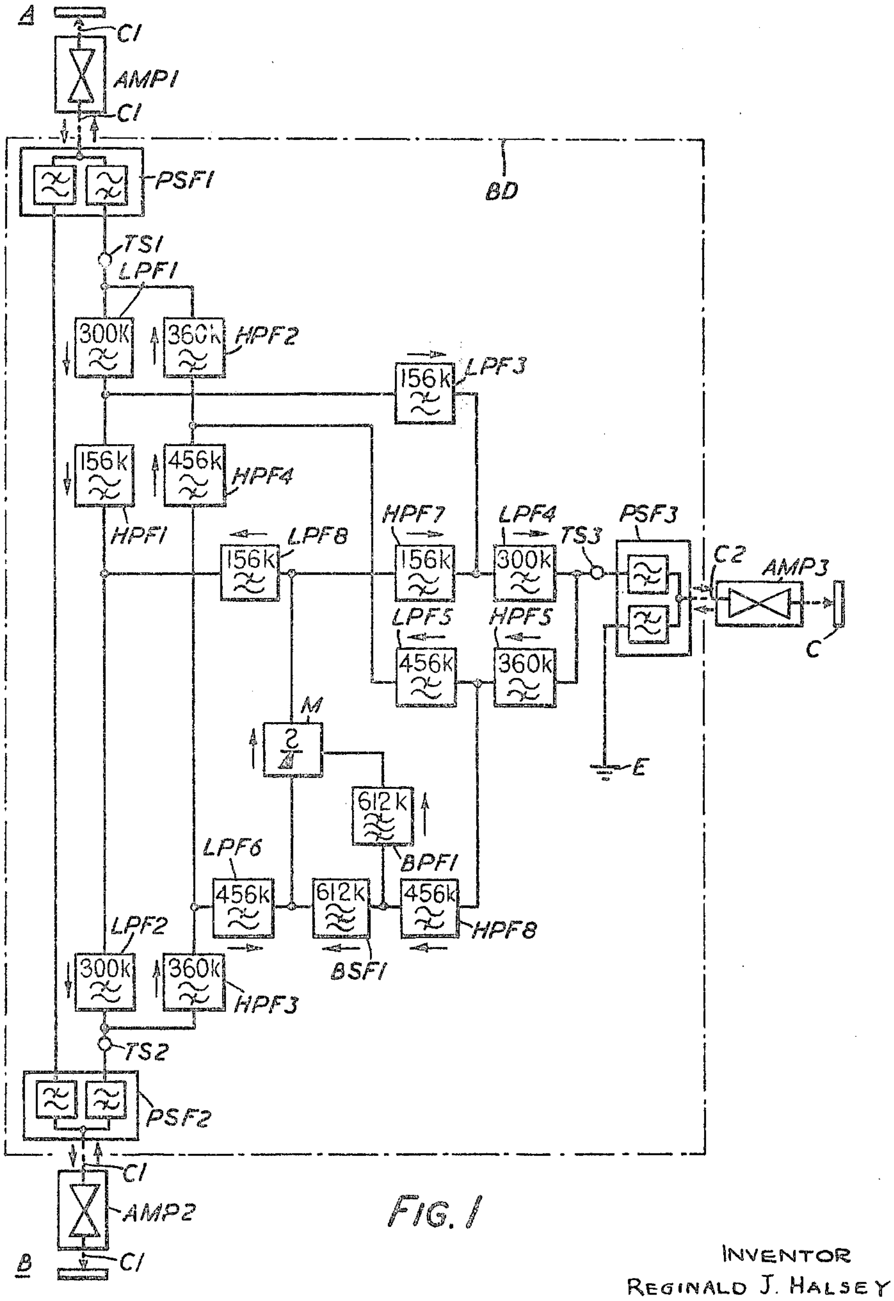
FIG. 1 shows a branching device in block schematic form and its manner of connection into a two-wire carrier multichannel communication system.

In FIG. 1 terminal stations A and B are joined by a two-wire cable C1 which, intermediate the stations A and B is severed, the severed ends being connected to terminal points TS1 and TS2 respectively of a branching device BD, shown within the broken-line enclosure. A third terminal point TS3 of the branching device BD is connected by a further two-wire cable C2 to a subsidiary terminal station C. In the cable C1 between the terminal points TS1 and TS2 and the respective terminal stations A and B are connected unattended submerged repeaters AMP1 and AMP2 and power separating filters PSF1 and PSF2. Filters PSF1 and PSF2 comprise low-pass and high-pass filters which isolate the branching device BD from the power supplies to the repeaters AMP1 and AMP2 whilst maintaining connection between power sources connected to the cable C1 at stations A and B. Similarly in the cable C2 between terminal point TS3 of the branching device BD and terminal station C are connected an unattended submerged repeater AMP3 and a power separating filter PSF3, similar to filters PSF1 and PSF2. Repeater AMP3 is fed with power from terminal station C and filter PSF3 isolates the branching device BD from that power supply and completes the power circuit from station C via a sea earth E. It will be appreciated that additional repeaters can be connected in cables C1 and C2 as necessary or desirable.

The branching device BD comprises a network of filters together with a modulator or frequency changer. The frequency band used for communication between stations A, B and C, in the system to be described, extends from 60 kc./s. to 600 kc./s. and comprises a lower division which extends from 60 kc./s. to 300 kc./s. and an upper division which extends from 360 kc./s. to 600 kc./s. The frequency allocations in the system to be described are illustrated diagrammatically in FIG. 2 and the filter network arrangement required to obtain these conditions is shown in FIG. 1.

Referring to FIG. 1, transmissions from terminal station A and destined for terminal station B take place in channels lying within the frequency range 156 kc./s. to 300 kc./s. and are routed from terminal point TS1 to terminal point TS2 by low-pass filters LPF1 and LPF2 and a high-pass filter HPF1. Filters LPF1 and LPF2 each have a cut-off frequency of 300 kc./s. whilst filter HPF1 has a cut-off frequency of 156 kc./s. Transmissions between these two terminal stations in the reverse direction, i.e. from B to A, take place in channels lying within the frequency range 456 kc./s. to 600 kc./s. and are routed from terminal point TS2 to terminal point TS1 by high-pass filters HPF2, HPF3 and HPF4. Filters HPF2 and HPF3 each have a cut-off frequency of 360 kc./s. and filter HPF4 has a cut-off frequency of 456 kc./s.

Transmissions from terminal station A and destined for terminal station C take place in channels lying within the frequency range 60 kc./s. to 156 kc./s. and from terminal point TS1 these transmissions are routed by filters LPF1 and HPF1 to a low-pass filter LPF3 which has a cut-off frequency of 156 kc./s. From filter LPF3 the transmissions pass through a low-pass filter LPF4 having a cut-off frequency of 300 kc./s. to terminal T3 and thence to station C. Transmissions in the reverse direction, from station C to station A, take place in channels lying in the frequency range 360 kc./s. to 456 kc./s. From terminal point TS3 these transmissions are routed through a high-pass filter HPF5 and a low-pass filter LPF5 to the junction of filters HPF2 and HPF4 from whence they pass via filter HPF2 to terminal TS1. Filter HPF5 has a cut-off frequency of 360 kc./s. and filter LPF5 a cut-off frequency of 456 kc./s.

Transmissions from terminal station B destined for terminal station C are transmitted from station B in channels lying within the frequency range 360 kc./s. to 456 kc./s. From terminal point TS2 these transmissions are routed by filters HPF3 and HPF4 through a low-pass filter LPF6, having a cut-off frequency of 456 kc./s., to the modulating signal input terminal of a modulator M. A carrier signal having a frequency of 612 kc./s. is fed to the carrier input terminal of the modulator as will be described later. From the output terminal of the modulator, the lower sideband signals pass via a high-pass filter HPF7, having a cut-off frequency of 156 kc./s., through filter LPF4 to terminal point TS3 and are received at terminal station C in channels lying within the frequency range 156 kc./s. to 252 kc./s.

For the reverse direction of transmission, i.e. from C and B, transmissions leave station C in channels lying within the frequency range 456 kc./s. to 552 kc./s. From terminal TS3 these transmissions are routed by filters HPF5 and LPF5 to a high-pass filter HPF8 from whence they pass to the modulating input signal input terminal of the modulator M. The lower side band signals from the output terminal of the modulator pass via a low-pass filter LPF8, having a cut-off frequency of 156 kc./s., to the junction of filters HPF1 and LPF2 and then through filter LPF2 to terminals TS2 and are received at station B in channels lying within the frequency range 60 kc./s. to 156 kc./s.

The modulator M is fed with a carrier signal from terminal station C, passing through filters HPF5, HPF8 and a narrow-band-pass filter BPF1 to the carrier input terminal of the modulator. The filter BPF1 prevents transmission signals being fed to the carrier input terminal of modulator M and a narrow-band-stop filter BSF1 prevents carrier signals passing to the modulating signal input terminal of the modulator or to the terminall points TS1 and TS2. The pass and stop bands of filters BPF1 and BSF1 are each centered on a frequency of 612 kc./s.

Figure 2:
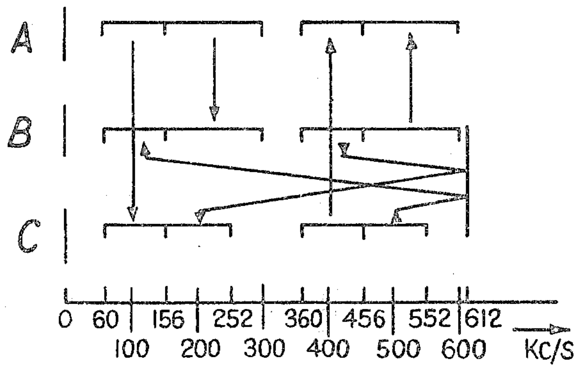
FIG. 2 is a frequency band utilisation chart relating to FIG. 1, and FIGS. 3 and 4 are frequency band utilisation charts relating to further embodiments of the invention.
Figure 3:
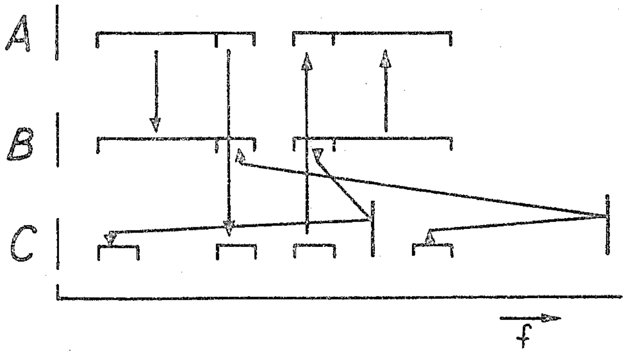
Figure 4:
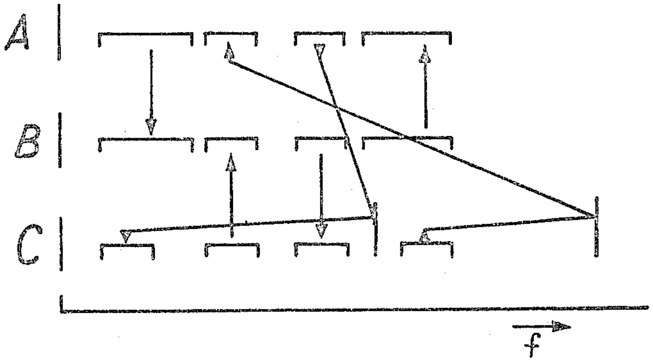

It will be appreciated that frequency allocations other than the one illustrated in FIG. 2 may be used in constructing a branching device in accordance with the invention. Examples of alternative allocations are indicated in FIGS. 3 and 4 in which use is made of two separate frequency changers in place of the single frequency changer used in the system indicated in FIG. 2. The manner of connection of the filter network between terminals TS1, TS2 and TS3 of the branching device to achieve the allocations indicated in FIGS. 3 and 4 are not indicated since they can readily be determined by a person skilled in the art.

The branching device may include equalisers connected at each of the three pairs of terminals to ensure that the impedance characteristics seen looking into these terminals from the outside are the same as would be seen looking into cable. It is then only necessary to arrange that the nearest repeaters are the correct distance from the branching point for the maintenance of the required transmission levels.

The design of the various filters and of the modulator described in connection with FIG. 1 follow principles generally known in the art.

I claim:

1. A branching device for a two-wire carrier multichannel communication system, the branching device having three terminal points, means providing transmission paths in opposite directions within first and second frequency groups respectively between first and second of the terminal points, means providing transmission paths in opposite directions within third and fourth frequency groups respectively between the first and third of the terminal points, means including a frequency changer arrangement interconnecting the second and the third terminal points providing respective opposite direction transmission paths, the transmission path from the second to the third terminal point including means defining one of the third and fourth frequency groups connected to an input of the frequency changer arrangement and means defining one of the first and second frequency groups connected to an output of the frequency changer arrangement, and the transmission path from the third terminal point to the second terminal point including means defining the other one of the first and second frequency groups connected to an input of the frequency changer arrangement and means defining the other one of the third and fourth frequency groups connected to an output of the frequency changer arrangement.

2. A branching device according to claim 1, in which the first and third frequency groups together comprise a lower division of a frequency band and the second and fourth frequency groups together comprise an upper division of the frequency band.

3. A branching device according to claim 2, in which the first and second frequency groups define lower portions of the respective lower and upper divisions of the frequency band.

4. A branching device according to claim 3, in which the transmission path from the second terminal point to the third terminal point includes means defining the fourth frequency group and means defining the first frequency group, and the transmission path from third terminal point to the second terminal point includes means defining the second frequency group and means defining the third frequency group.

5. A branching device according to claim 4, in which the frequency changer arrangement comprises a modulator common to each of the transmission paths between the second and third points.

6. A branching device according to claim 5, and including means for routing a modulating signal from the third terminal point to the modulator.

7. A branching device according to claim 2, in which the first and fourth frequency groups define lower portions of the respective lower and upper divisions of the frequency band.

8. A branching device according to claim 7, in which the transmission path from the second terminal point to the third terminal point includes means defining the fourth frequency group and means defining the first frequency group, and the transmission path from the third terminal point to the second terminal point includes means defining the second frequency group and means defining the third frequency group.

9. A branching device according to claim 8, in which the respective transmission paths between the second and third terminal points include separate modulators which together constitute the said frequency changer arrangement.

10. A branching device according to claim 1, in which the second and fourth frequency groups together define a lower division of a frequency band and the first and third frequency groups define an upper division of the frequency band.

11. A branching device according to claim 10, in which the second and third frequency groups define lower portions of the respective lower and upper divisions of the frequency band.

12. A branching device according to claim 11, in which the transmission path from the second terminal point to the third terminal point includes means defining the third frequency group and means defining the second frequency group, and in which the transmission path from the third terminal point to the second terminal point includes means defining the first frequency group and means defining the fourth frequency group.

13. A branching device according to claim 12, in which the respective transmission paths between the second and third terminal points include separate modulators which together constitute the said frequency changer arrangement.

14. A branching device for a two-wire carrier multichannel communication system, the branching device having three terminal points; first filter means defining a first group of frequencies and providing a transmission path in one direction between first and second of the terminal points; second filter means defining a second group of frequencies and providing a transmission path in the opposite direction between the first and second terminal points; third filter means defining a third group of frequencies and providing a transmission path in one direction between the first and third of the terminal points; fourth filter means defining a fourth group of frequencies and providing a transmission path in an opposite direction between the first and third terminal points; frequency changer means for changing frequencies lying in the first and second groups to frequencies lying in the third and fourth groups and for changing frequencies lying in the third and fourth groups to frequencies lying in the first and second groups; a transmission path from the second to the third terminal point including fifth filter means defining one of the third and fourth groups connected to an input of the frequency changer means and sixth filter means defining one of the first and second frequency groups connected to an output of the frequency changer means; and a transmission path from the third to the second terminal point including seventh filter means defining the other one of the first and second frequency groups connected to an input of the frequency changer means and eighth filter means defining the other one of the third and fourth frequency groups connected to an output of the frequency changer means.

15. A branching device according to claim 14, in which the first and third filter means together define a lower division of a frequency band and in which the second and fourth filter means together define an upper division of the frequency band.

16. A branching device according to claim 15, in which the first and second filter means define lower portions of the respective lower and upper divisions of the frequency band.

17. A branching device according to claim 16, in which the fifth and sixth filter means define the fourth and first frequency groups respectively and in which the seventh and eighth filter means define the second and third frequency groups respectively.

18. A branching device according to claim 17, in which the frequency changer means comprises a modulator common to both transmission paths between the second and third terminal points.

19. A branching device according to claim 18, and including filter means for directing a modulating signal from the third terminal point to the modulator.

20. A two-wire carrier multichannel communication system having three terminal stations and four groups of communication channels alloted to each station; a branching device having three terminal points, two-wire links connecting respective ones of the terminal points with respective ones of the terminal stations; a transmission path from a first to a second of the terminal points and interconnecting a first group of the communication channels of a first and a second of the terminal stations; a transmission path from the second terminal point to the first terminal point and interconnecting a second group of the communication channels of the first and second terminal stations; a transmission path from the first terminal point to the third of the terminal points and interconnecting a third group of the communication channels of the first terminal station and the third of the terminal stations; a transmission path from the third terminal point to the first terminal point and interconnecting the fourth of the groups of communication channels of the third and first terminal stations; and two opposite direction transmission paths between the second and third terminal points interconnecting the third and fourth groups of communication channels of the second terminal station with separate ones of the first and second groups of communication channels of the third terminal station, the opposite direction transmission paths including frequency changing means.

21. A communication system according to claim 20, in which the frequency changing means comprises a modulator common to both of the opposite direction transmission paths.

22. A communication system according to claim 21, in which each two-wire link includes a both-way amplifier.

23. A two-wire carrier multichannel communication system having three terminal stations and having four corresponding groups of communication channels allotted to each station, in which transmission between first and second of the terminal stations occurs in one direction in a first group of the channels of those two staitons, and in opposite direction in a second group of the channels of those two stations; transimssion between the first and the third of the terminal stations occurs in one direction in a third group of the channels of those two stations, and in an opposite direction in a fourth group of the channels of those two stations; transmission from the second terminal station to the third terminal station originates from one of the third and fourth groups of channels of the second station and is received by one of the first and second groups of channels of the third terminal stations; and transmission from the third terminal station to the second terminal station originates from the other one of the first and second groups of channels of the third terminal station and is received by the other one of the third and fourth groups of channels of the second terminal station.

24. A communication system according to claim 23, in which the said ones of the groups of channels of the second and third terminal stations are the fourth and first groups respectively, and the said other ones of the groups of channels of the second and third stations are the second and third groups respectively.

References Cited by the Examiner

UNITED STATES PATENTS 2,623,123 12/1952 Matte -------------- 179—15

DAVID G. REDINBAUGH, *Primary Examiner.*

R. L. GRIFFIN, *Assistant Examiner.*